(No Model.) 13 Sheets—Sheet 1.

A. H. PRENZEL.
SHOE SEWING MACHINE.

No. 589,908. Patented Sept. 14, 1897.

WITNESSES:

INVENTOR

BY

ATTORNEYS.

(No Model.) 13 Sheets—Sheet 2.

A. H. PRENZEL.
SHOE SEWING MACHINE.

No. 589,908. Patented Sept. 14, 1897.

WITNESSES:

INVENTOR

BY

ATTORNEYS.

(No Model.)
13 Sheets—Sheet 4.

A. H. PRENZEL.
SHOE SEWING MACHINE.

No. 589,908.
Patented Sept. 14, 1897.

WITNESSES:

INVENTOR
BY
ATTORNEYS.

(No Model.) 13 Sheets—Sheet 5.
A. H. PRENZEL.
SHOE SEWING MACHINE.
No. 589,908. Patented Sept. 14, 1897.
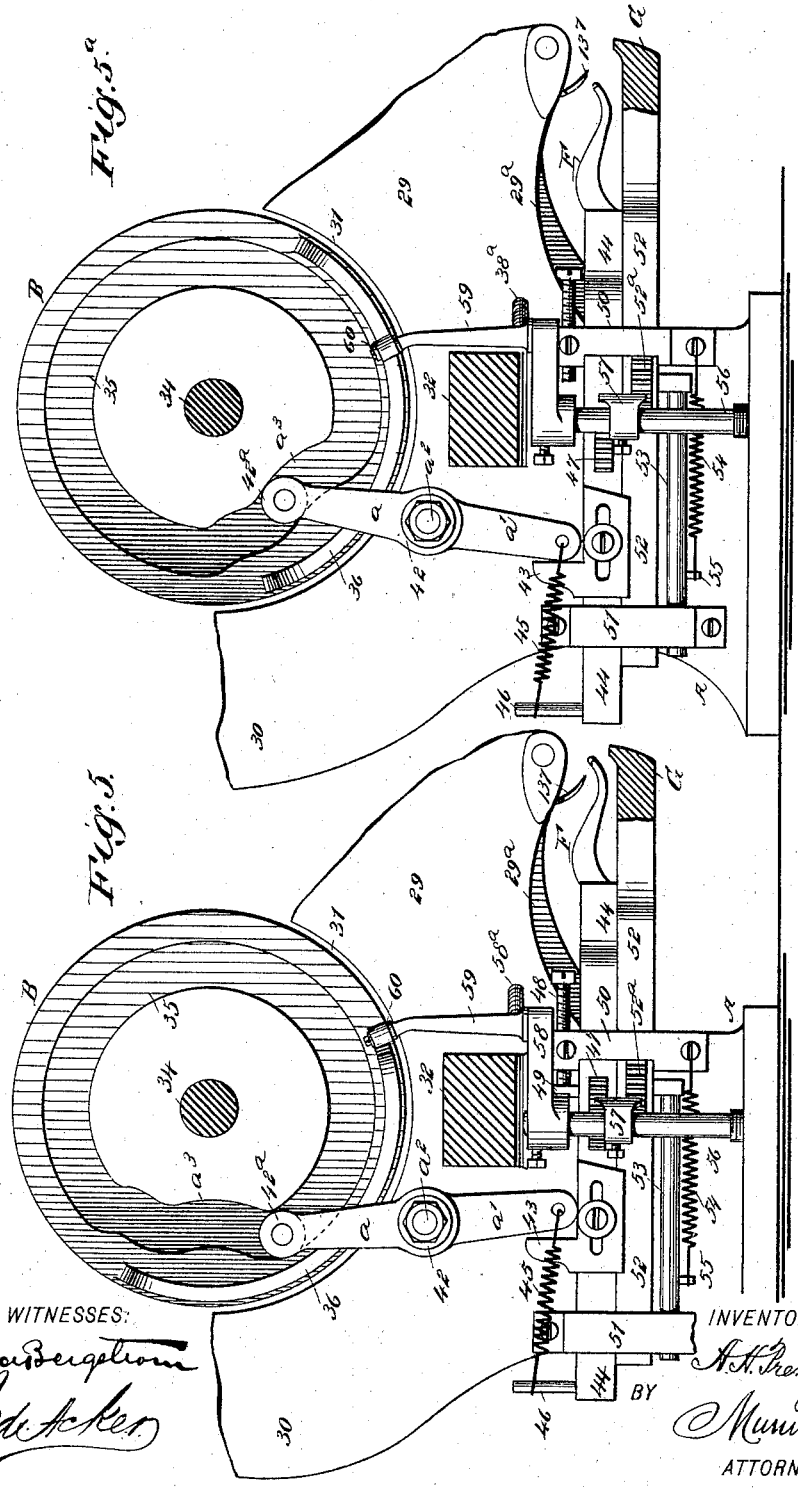
WITNESSES:
INVENTOR
BY
ATTORNEYS.

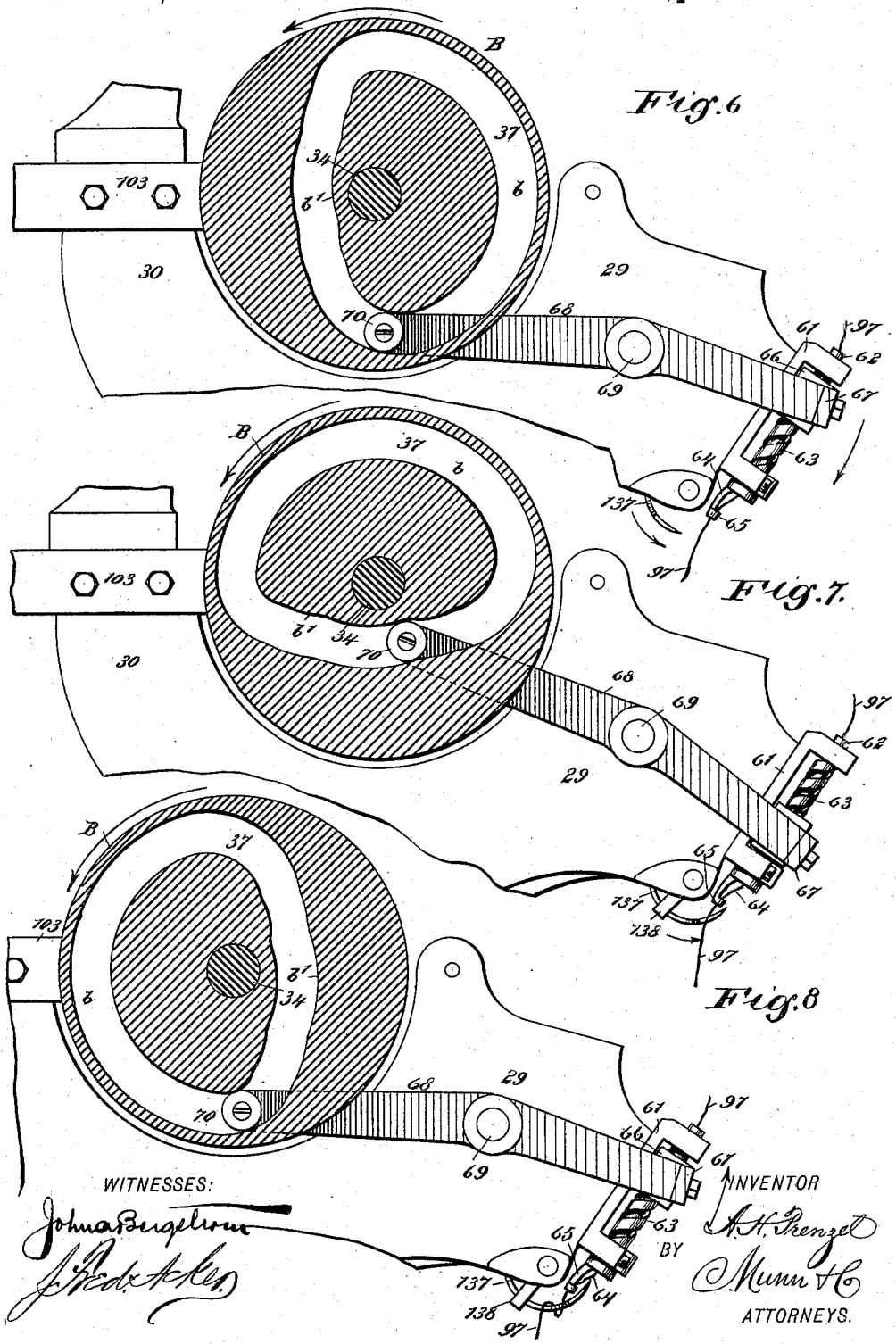

(No Model.) 13 Sheets—Sheet 7.
A. H. PRENZEL.
SHOE SEWING MACHINE.
No. 589,908. Patented Sept. 14, 1897.
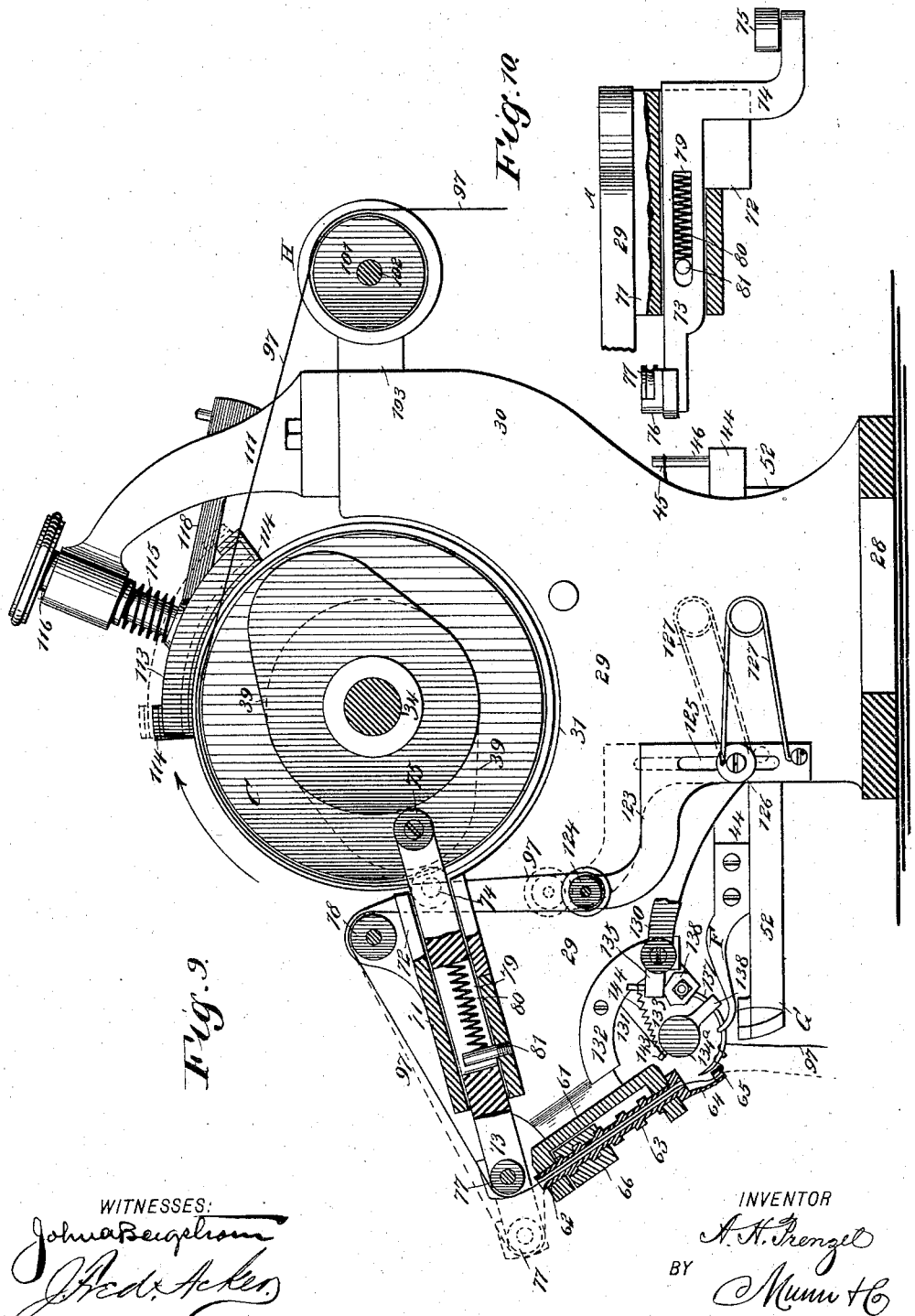
WITNESSES:
INVENTOR
BY
ATTORNEYS.

(No Model.)
13 Sheets—Sheet 8.

A. H. PRENZEL.
SHOE SEWING MACHINE.

No. 589,908. Patented Sept. 14, 1897.

WITNESSES:
Joshua Bergstrom
Fred Acker

INVENTOR
A. H. Prenzel
BY
Munn & Co
ATTORNEYS.

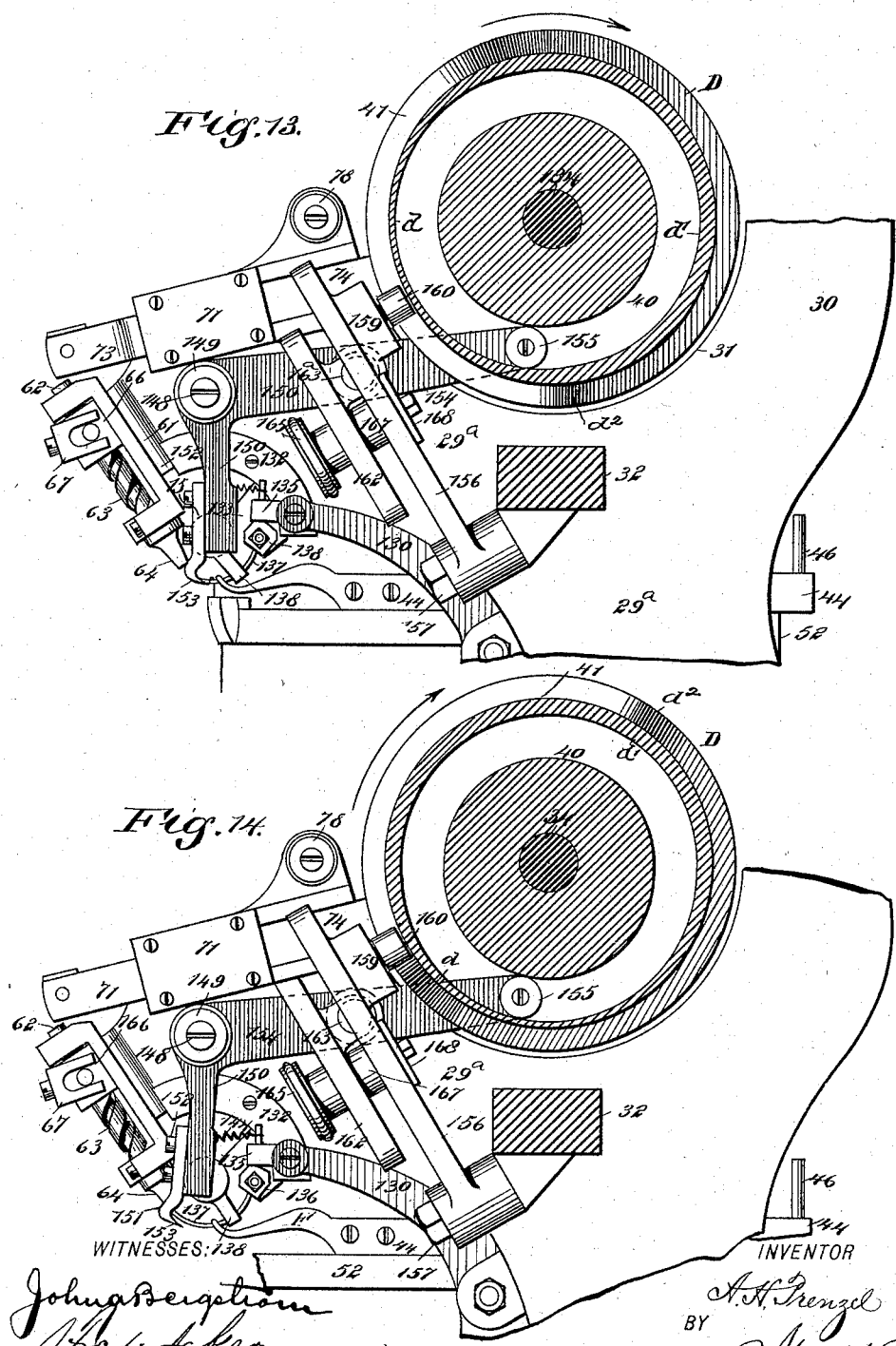

(No Model.) 13 Sheets—Sheet 10.

A. H. PRENZEL.
SHOE SEWING MACHINE.

No. 589,908. Patented Sept. 14, 1897.

WITNESSES:
Johua Bergstrom
J. Fred Acker

INVENTOR
A. H. Prenzel
BY
Munn & Co
ATTORNEYS.

(No Model.) 13 Sheets—Sheet 11.
A. H. PRENZEL.
SHOE SEWING MACHINE.
No. 589,908. Patented Sept. 14, 1897.
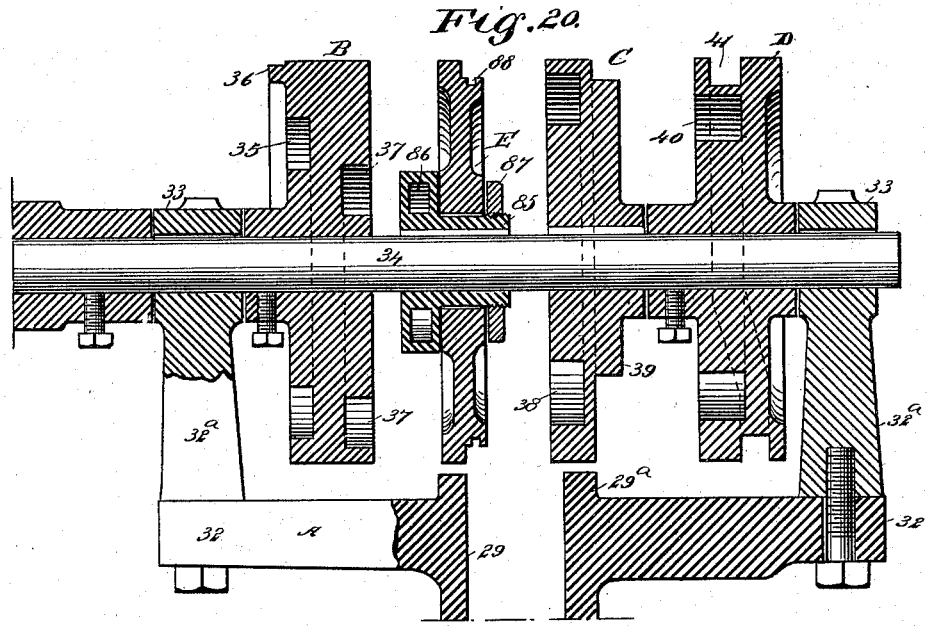
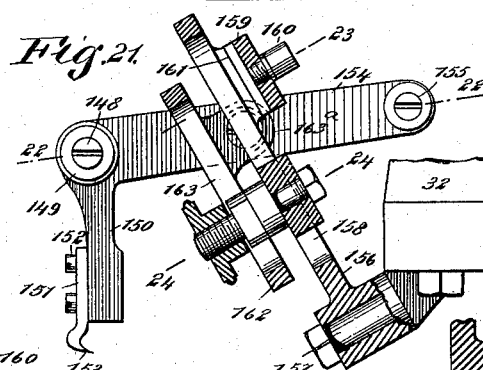
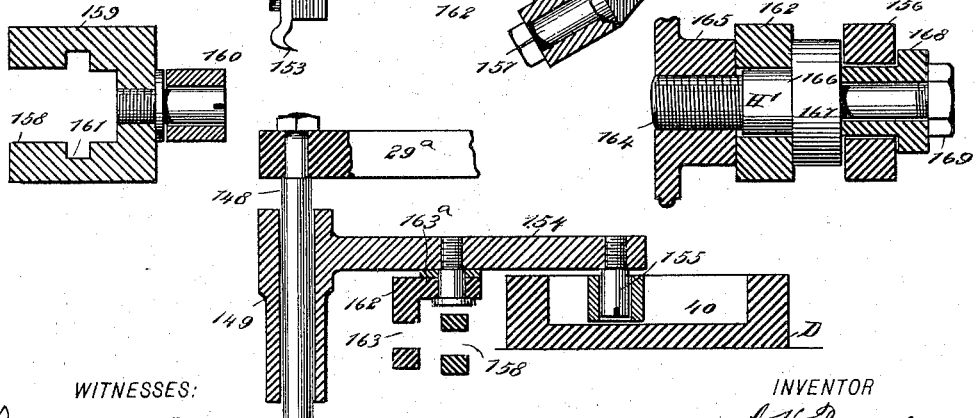
WITNESSES:
John a Bergstrom
Fred Acker
INVENTOR
A. H. Prenzel
BY
Munn & Co
ATTORNEYS.

(No Model.) 13 Sheets—Sheet 12.

A. H. PRENZEL.
SHOE SEWING MACHINE.

No. 589,908. Patented Sept. 14, 1897.

WITNESSES:

INVENTOR

BY

ATTORNEYS.

(No Model.)

13 Sheets—Sheet 13.

A. H. PRENZEL.
SHOE SEWING MACHINE.

No. 589,908. Patented Sept. 14, 1897.

UNITED STATES PATENT OFFICE.

ADAM H. PRENZEL, OF ADAMSDALE, PENNSYLVANIA, ASSIGNOR, BY DIRECT AND MESNE ASSIGNMENTS, OF THREE-FOURTHS TO FRANKLIN P. ADAMS, OF SAME PLACE, AND KATIE V. ZUBER, OF READING, PENNSYLVANIA.

SHOE-SEWING MACHINE.

SPECIFICATION forming part of Letters Patent No. 589,908, dated September 14, 1897.

Application filed March 29, 1895. Serial No. 543,720. (No model.)

*To all whom it may concern:*

Be it known that I, ADAM HENRY PRENZEL, of Adamsdale, in the county of Schuylkill and State of Pennsylvania, have invented a new and Improved Turn-Shoe Sewing-Machine, of which the following is a full, clear, and exact description.

My invention relates to an improvement in turn-shoe sewing-machines; and it has for its object to provide a machine of such character which will be exceedingly simple, durable, and economic in its construction; and the invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
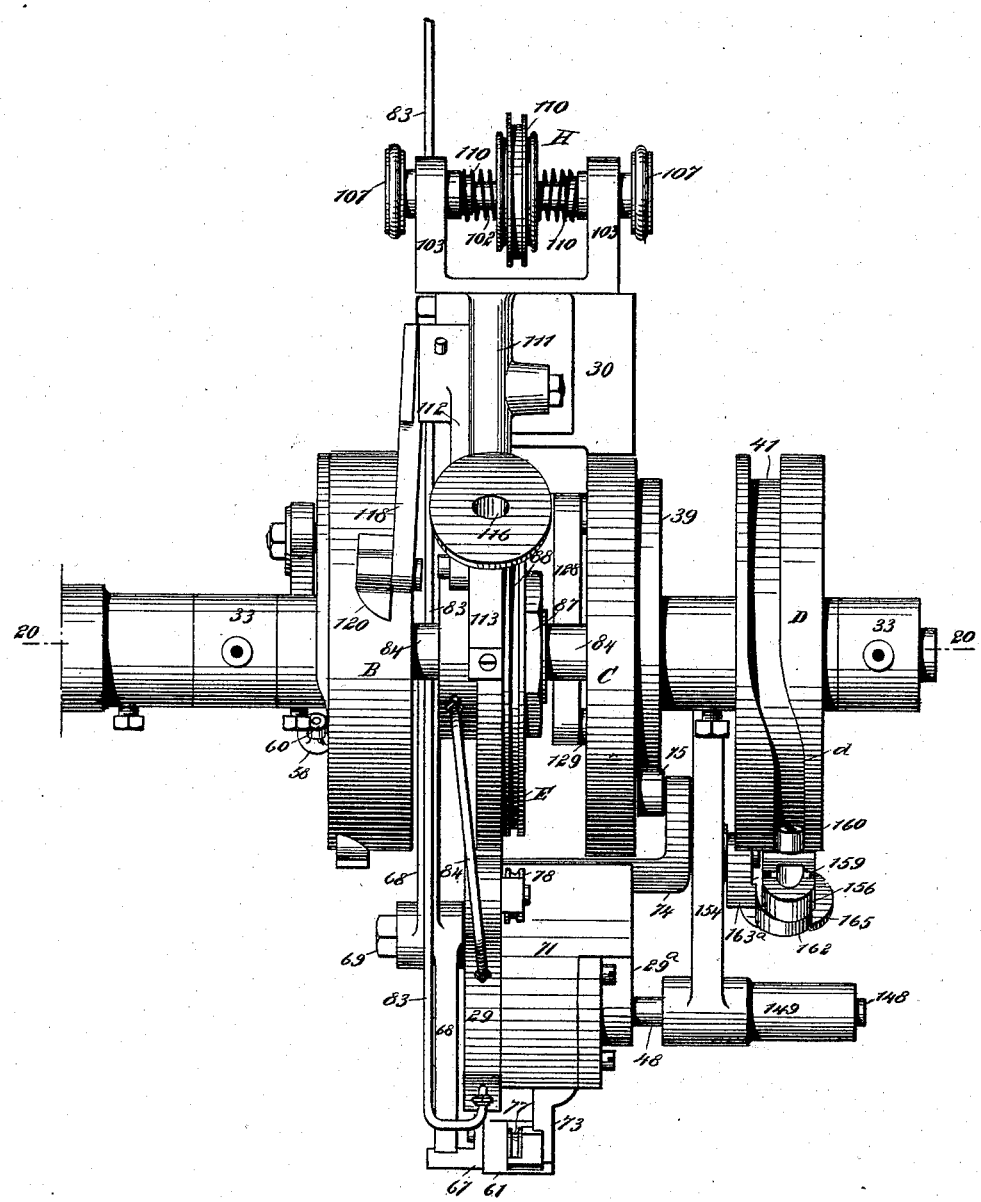
Figure 2:
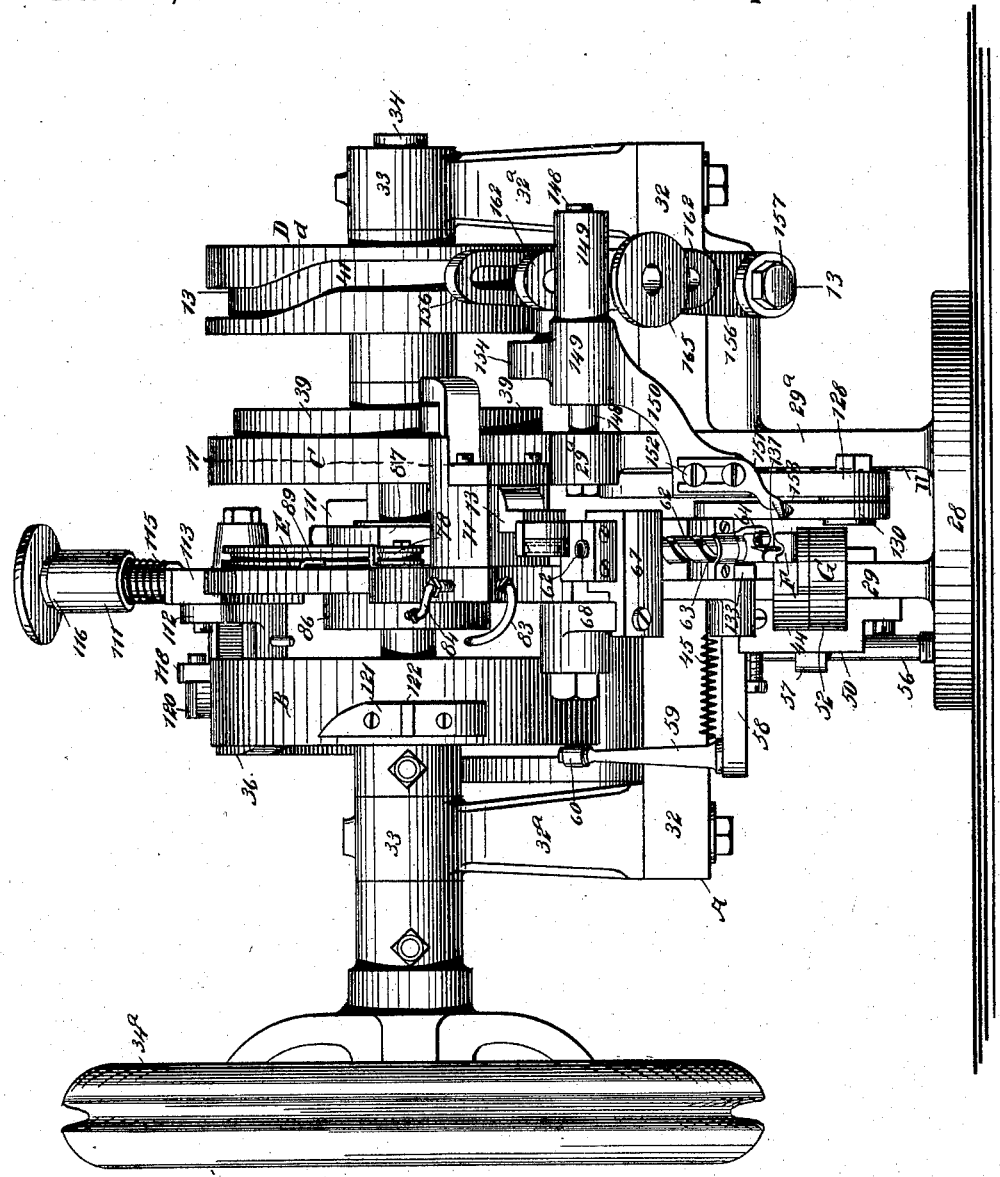
Figure 3:
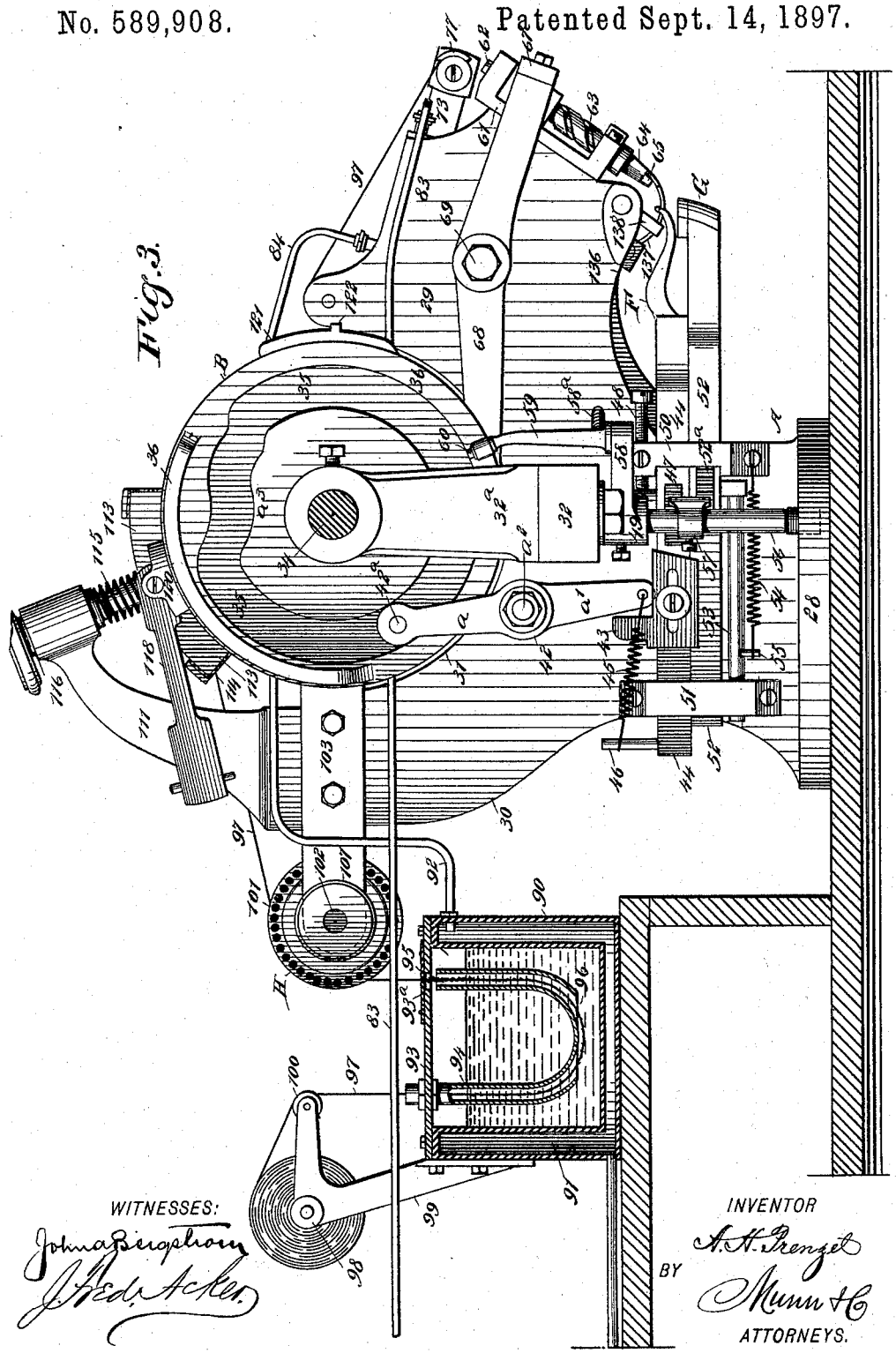
Figure 4:
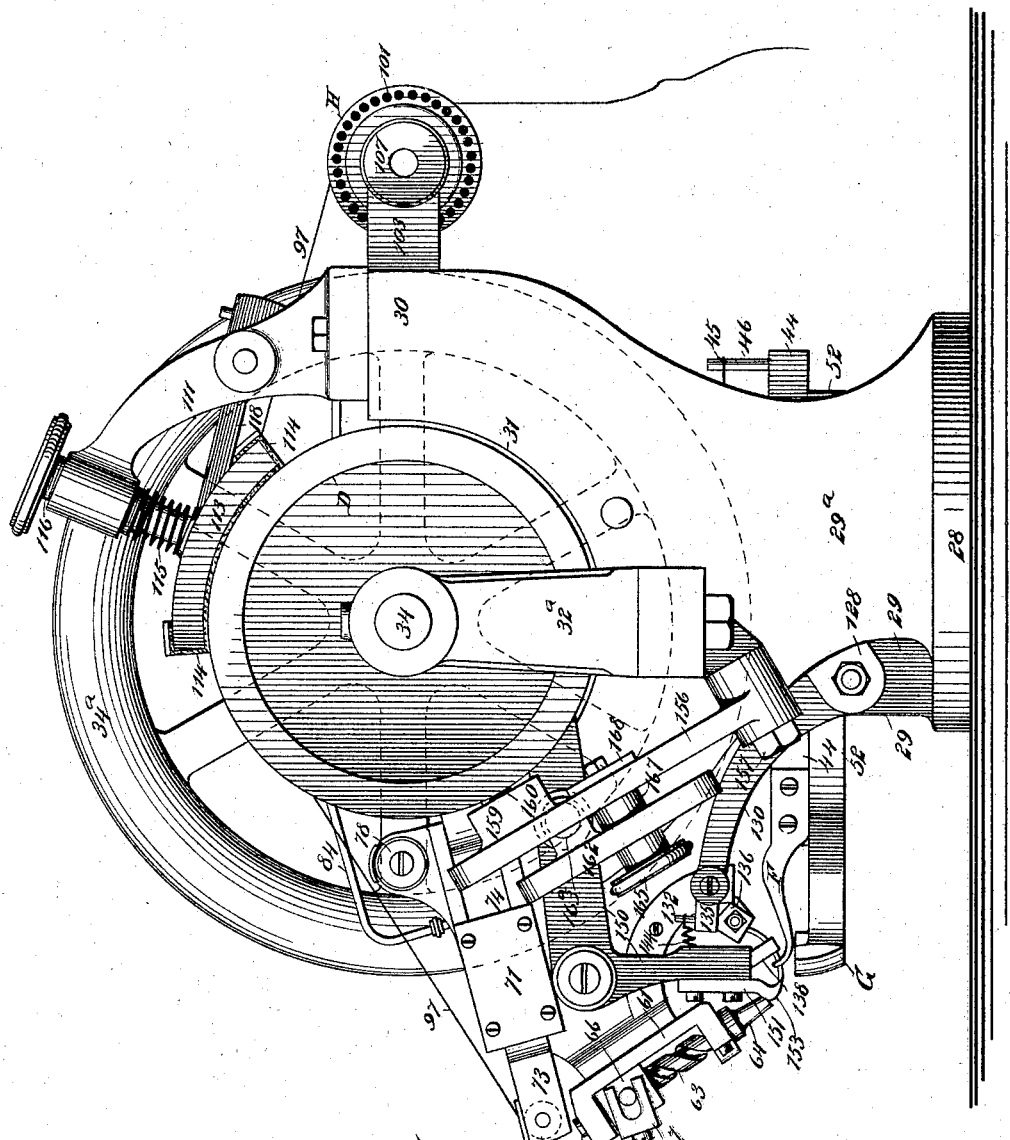
Figure 71:
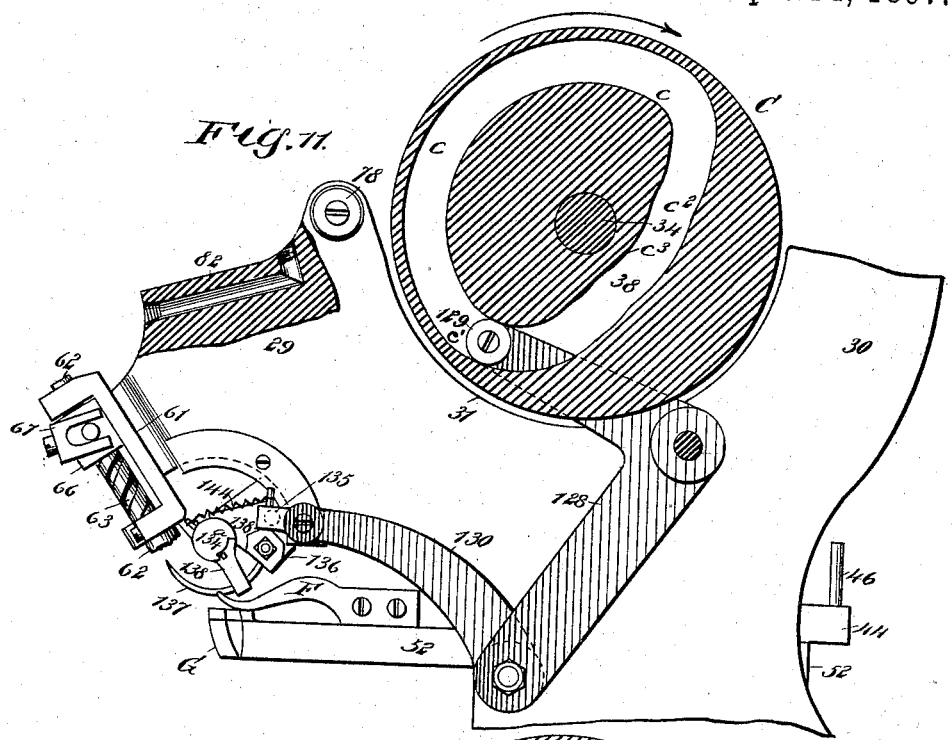
Figure 72:
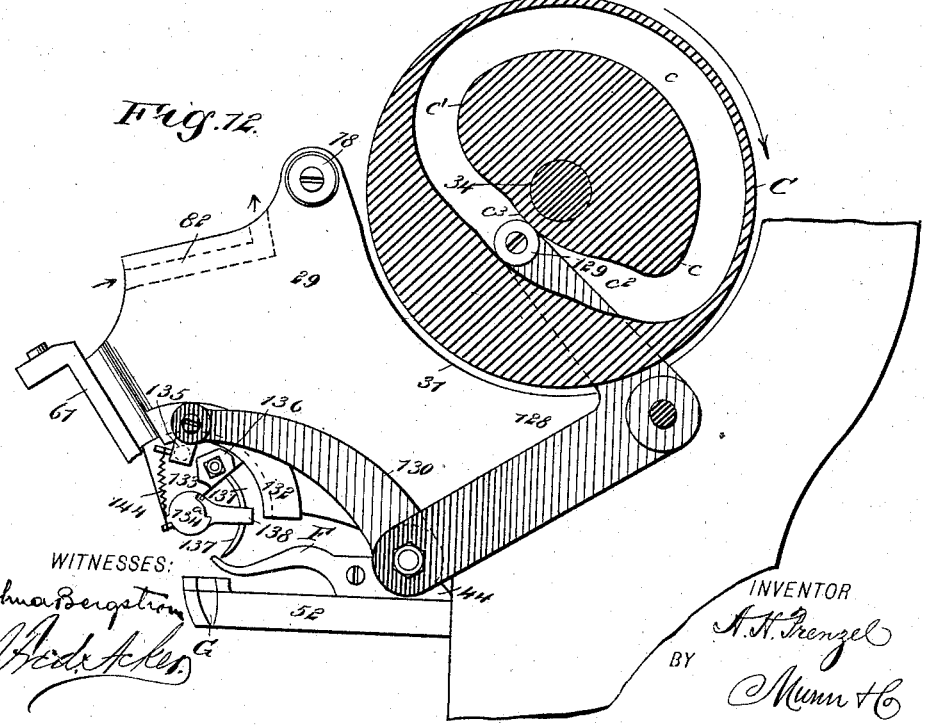
Figure 15:
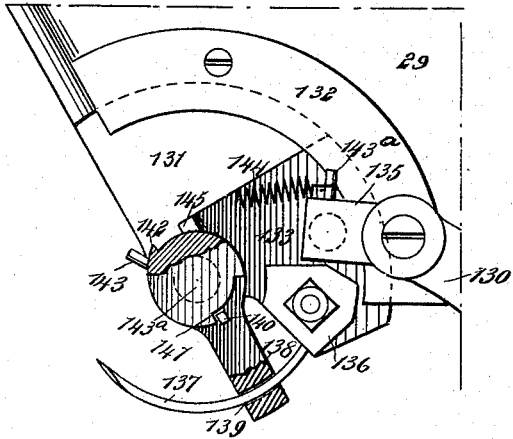
Figure 16:
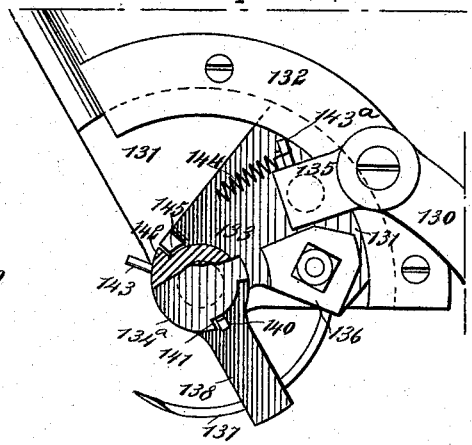
Figure 17:
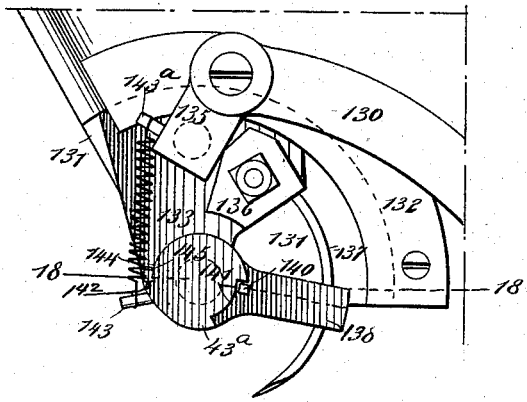
Figure 18:
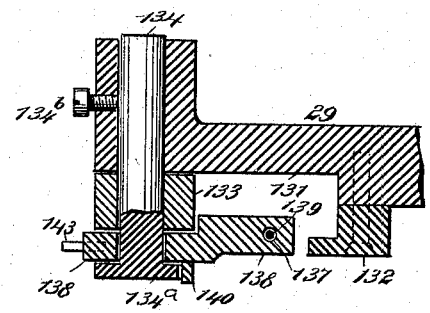
Figure 19:
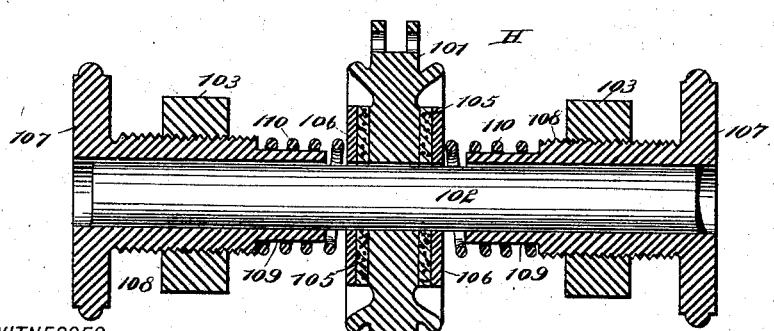
Figure 25:
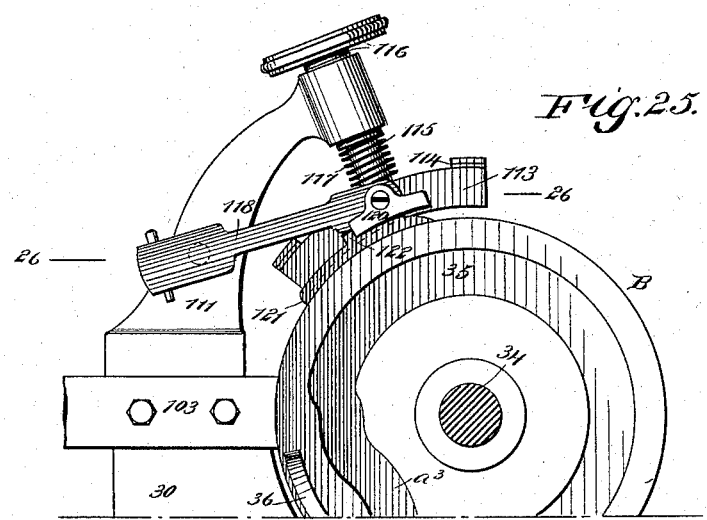
Figure 26:
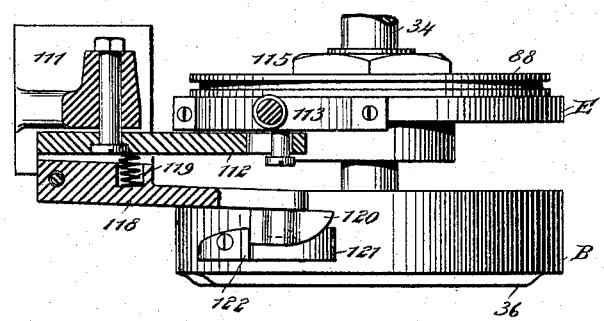
Figure 27:
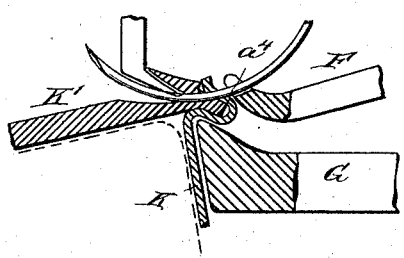
Figure 28:
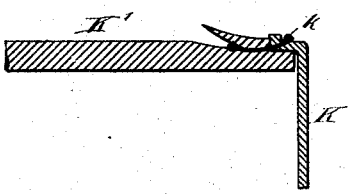
Figure 29:
Figure 30:
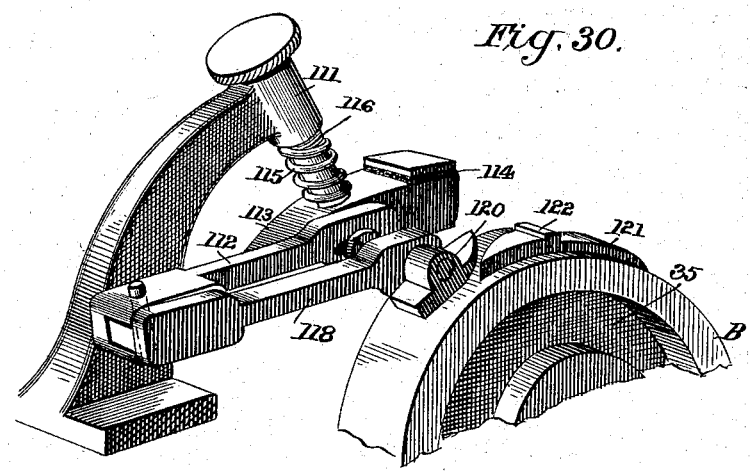
Figure 31:
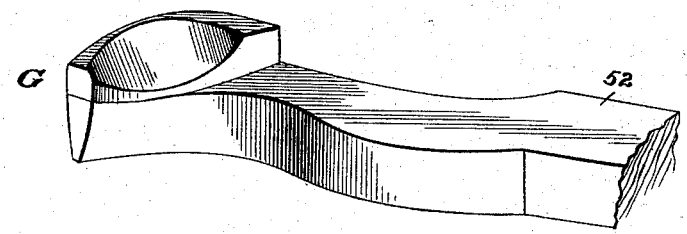

Figure 1 is a plan view of the machine. Fig. 2 is a front elevation thereof. Fig. 3 is a view of the left-hand side of the machine with the drive-wheel removed and showing the main shaft in section. Fig. 4 is a view of the right-hand side of the machine. Fig. 5 is a detail view illustrating the breakdown and shoe rest or anvil, together with their operating mechanism and the cam on the drive-shaft through which they are operated, the said breakdown and shoe-rest being in their full outward position; and Fig. 5ª is a view similar to Fig. 5, in which the shoe-rest is shown free to move backward and the breakdown has been carried rearward. Fig. 6 is a diagrammatic view of the driving mechanism for the looper-shaft and looper-arm, the shaft being shown in the position it occupies when the needle is receding. Fig. 7 is a view similar to Fig. 6, in which the mechanism has turned the looper-shaft and looper-arm so as to bring the thread over the needle; and Fig. 8 is a view similar to Figs. 6 and 7, in which the looper shaft and arm are shown as turned to produce a loop around the needle. Fig. 9 is a sectional view through the machine, illustrating the looper arm and shaft in section, the needle as having the thread looped around it, the shoe-rest and breakdown being shown in the position they occupy when the needle is producing a stitch and the take-up being likewise in section, and this view also illustrates the cam operating the take-up. Fig. 10 is a detail view of the take-up, its slideway being in section. Fig. 11 is a diagrammatic sectional view illustrating the mechanism for operating the needle, the needle being in the position it occupies in making a stitch and the section being taken on the line 11 11 of Fig. 2. Fig. 12 is a view similar to Fig. 11, the needle being at the full extent of its rearward throw. Fig. 13 is a section through the machine, taken substantially on the line 13 13 of Fig. 2, illustrating the feed device and the mechanism for driving the same, the feed-foot being in feeding position; and Fig. 14 is a view similar to Fig. 13, in which the feed-shoe is out of feeding position. Fig. 15 is a detail view of the needle and the mechanism directly connected therewith, the said needle being in its first position. Fig. 16 is a view similar to Fig. 15, the needle being in its second position or just about to take its rearward movement; and Fig. 17 is a view similar to Figs. 15 and 16, the needle being at the end of its inward throw. Fig. 18 is a section on the line 18 18 of Fig. 15. Fig. 19 is a sectional view through the main tension device. Fig. 20 is a section through the cams and tension-wheel, showing the drive-shaft upon which they are mounted in side elevation. Fig. 21 is a detail view of the device for lengthening or shortening the throw of the feed-shoe. Fig. 22 is a section on the line 22 22 of Fig. 21. Fig. 23 is a section on the line 23 23 of Fig. 21, and Fig. 24 is a section on the line 24 24 of Fig. 21. Fig. 25 is a side elevation of the brake mechanism for the tension-wheel. Fig. 26 is a section on the line 26 26 of Fig. 25. Fig. 27 is a sectional view of the shoe-rest and the breakdown, together with a sectional view of a portion of the sole and upper of a shoe, the needle being illustrated in the act of making a stitch and the feed-shoe in position to feed. Fig. 28 is a sectional view through a portion of the sole and upper of a shoe, illustrating the stitches connecting the two and the shoe in the condition in which it leaves the machine. Fig. 29 is a view similar to Fig. 28, the upper having been turned over. Fig. 30 is a detail perspective view of the brake mechanism for the tension-wheel, and Fig. 31 is a detail perspective view of the shoe rest or table.

In carrying out the invention the frame A of the machine may be of any desired character. As shown in the drawings, however, it comprises a base 28 and two vertical webs 29 and $29^a$, rising from the base, one at each side of the center, which webs extend in a forwardly direction, the left-hand web 29 being usually carried farther forward than the right-hand one, and these webs unite at the back of the machine, forming a solid upwardly-curved section 30, and the upper edges of the webs and solid rear section of the frame are concaved, as shown at 31 in the drawings, especially in Figs. 3, 5, and $5^a$.

A horizontal arm 32 is projected outwardly from each web of the frame at or near the center, and each of these arms carries a vertical standard $32^a$, terminating at the top in a box 33. The drive-shaft 34 is journaled in the boxes 33 of the frame and carries, preferably at its left-hand end, a drive wheel or pulley $34^a$, which may be operated by hand or by suitably-applied power.

Three cam-disks (designated, respectively, as B, C, and D) are secured upon the drive-shaft between its journals, and a tension-wheel E is located on the said shaft between the cam-disks B and C, being loosely mounted on the shaft, as shown best in Fig. 20. The first disk B is provided upon its outer or left-hand face with a cam-rib 36 near the periphery and extending about one-half the circumference of the disk, and in the same face of the said disk B a cam-groove 35 is produced, while in the opposite face a second cam-groove 37 is made. The disk C is provided upon its left-hand face with a cam-groove 38 and a cam projection 39 upon its right-hand face, while the disk D is provided in its left-hand face with a cam groove or race 40 and a peripheral groove or race 41.

I will first describe the shoe rest or anvil (designated as G) and the breakdown, (designated as F,) the latter being intended for defining the shoulder of the upper upon the sole, as illustrated in Fig. 27, together with the mechanism for operating the same. These parts are all located at the left-hand side of the machine.

An angle-lever 42 is fulcrumed upon the web 29 of the frame near the rear, comprising an upper member $a$, a lower member $a'$, the two being in substantially parallel lines, and a pivoted and connecting member $a^2$, whereby the upper member is held out of the plane of the lower one. The upper member is provided with a friction roller or pulley $42^a$ at its upper end, held to travel in the cam groove or race 35 in the left-hand face of the first cam-disk B, as shown in Figs. 5 and $5^a$, while the lower member $a'$ of the said lever is adapted to engage with a stud 43, adjustably secured upon a bar 44, to which the breakdown F is attached or made integral with it. The bar 44 is held to slide horizontally at the left-hand portion of the frame, and a spring 45, attached to the lower member of the lever 42, is likewise secured to an extension 46 from the rear of the breakdown bar or shank 44, the tendency of the spring being to draw the lower end of the lever in direction of the stud 43 on the said shank or bar.

The breakdown shank or bar has a number of teeth 47 produced upon its outer face at or near its center, forming a rack-surface, and the forward movement of the said bar 44 is limited by an adjusting-screw 48, engaging with a pin 49, attached to the bar, the screw 48 being placed in a guide 50, through which the bar passes and in which it has sliding movement, a second guide 51 being provided at the rear of the machine. The shank or bar 52 of the shoe rest or anvil G slides beneath the corresponding portion of the breakdown and in the aforesaid guides 50 and 51. The shank of the shoe-rest is also provided with teeth $52^a$, being located beneath the teeth on the shank or bar of the breakdown.

The shank of the shoe-rest is provided with a guide-bar 53, secured thereto at its bottom portion and held to slide in the rear guide 51, and a spring 54, which is secured to a stud 55 on the aforesaid guide-bar 53, is likewise secured to the forward guide 50 or a corresponding support, and the said spring acts to keep the shoe-rest in its full outer position, as shown in Fig. 5.

A vertical shaft 56 is journaled in the base and extends upward past the shanks of both the breakdown and shoe-rest and is provided with a pawl 57 of sufficient width to engage with the teeth of both of the bars or shanks 44 and 52. A horizontal arm 58 is secured to the upper end of the shaft 56, and from the horizontal arm a vertical arm 59 is upwardly projected, provided with a friction-roller 60, adapted to travel upon the left-hand marginal surface of the first cam-disk B and upon the cam-rib 36 thereof, and the roller 60 is held constantly in engagement with the said disk by means of a spring $58^a$.

The shoe-rest is of substantially anvil form and extends in direction of the right-hand side of the machine, the shoe to be sewed, and likewise the last, being made to bear against the front face of the said rest or anvil, which is more or less concaved, and preferably the upper face of the shoe-rest is somewhat concaved, especially at its right-hand side. The breakdown is in the nature of a fork, being bifurcated at its outer end, and it is secured to the right-hand side of its shank or bar 44 and is curved downwardly and upwardly, the bifurcations being in its upper outer end, and the said breakdown is adapted to move longitudinally over the body of the shoe-rest.

The shape of the shoe-rest enables the shoulder in the upper, for the reception of the needle, to be readily formed by the breakdown, as hereinafter fully described.

The cam-groove 35 is provided with a depressed or irregular section $a^3$, and in the operation of this portion of the machine, when the parts are in the position shown in Fig. 5, the last and upper will have been pressed against the forward face of the shoe-rest, as shown in Fig. 27, the sole and the portion of the upper to be attached to the sole extending over the said rest, and the breakdown being at its extreme forward throw will define the shoulder $a^4$ of the upper or hold the upper firmly upon the sole, so that the needle when it passes between the bifurcation of the fork-breakdown will at all times take the upper as it passes through the channel of the sole.

During the operation of stitching the friction-roller of the lever 42 will be traveling in the concentric portion of the cam-groove 35 and the friction-roller of the locking-shaft 56 will be traveling upon the plane surface of the aforesaid cam-disk B. When the stitch is completed, the position of the parts will be substantially that shown in Fig. 5, and as the shaft revolves the friction-roller 69 of the lock-shaft will enter upon the cam-rib 36 and by rocking the shaft 56 outward will carry the pawl from engagement with the teeth or racks of the shanks of the breakdown and shoe-rest, while at the same time the friction-roller $42^a$ of the lever 42 will enter the irregular or eccentric portion $a^3$ of the cam-groove 35, causing its lower end to strike the stud 43 on the shank of the breakdown, moving the same rearward out of the way and enabling the shoe to be moved along the rest or to be removed therefrom, and the shoe may be adjusted on the rest or against it, since the shank or bar of the rest at this time will be free to move rearward against the tension of its spring 54. As another stitch is to be made the upper end of the lever will have traveled up the irregular portion $a^3$ of the cam-groove 35 sufficiently to release its lower end from the stud 43, and the spring 45 will thereupon act to force the breakdown F again outward to its working position, while as soon as it assumes this position the friction-roller 60 on the locking-shaft will have passed off of the cam-rib 36 and the pawl 57 will have again entered the teeth 47 and $52^a$, holding both the breakdown and the shoe-rest stationary during the operation of making the next stitch.

I will next describe the looper and its operative mechanism, together with the take-up. These parts are best shown in Figs. 1, 3, 4, 6, 7, 8, 9, and 10. The forward end of the left-hand web 29 is inclined in a downwardly direction, and a bearing 61 is secured to this inclined surface. A looper-shaft 62 is journaled in the aforesaid bearing 61, the said looper-shaft being hollow, and it is provided between its journaled portions with an exterior thread 63. At the lower end of the looper-shaft 62, below the bearing 61, a looper-arm 64 is downwardly and inwardly projected, the said looper-arm being somewhat segmental in cross-section and terminating at its lower end in an eye 65. A nut 66 is held to travel upon the threaded portion of the looper-shaft, and the said nut is provided with trunnions projecting into slots in lugs on a strip 67, whereby it is pivotally and loosely connected with said strip, the left-hand end of the strip being attached to a lever 68, the said lever being fulcrumed upon a post 69, located upon the outer face of the web 29, and the fulcrum of the lever 68 is at or near its center.

The rear end of the lever 68 is provided with a friction-roller 70, which is journaled in the cam groove or race 37 in the right-hand face of the first cam-disk B, as shown particularly in Figs. 6, 7, and 8. This cam groove or race is provided with a concentric section $b$ and an eccentric section $b'$, the eccentric section being made to approach a straight course.

In the operation of the looper, when the needle is in its inner position, having been withdrawn from the work, the nut will be at the upper end of the looper-shaft, as shown in Fig. 6, and the convexed surface of the looper-arm will face the needle. Before the needle approaches the looper-arm the lever 68 will have been acted upon through the medium of the cam-groove 37 in a manner to force the nut downward and thus revolve the shaft, and, as will be hereinafter described, when the needle approaches the eye of the looper-arm the thread will be caught upon the barb of the needle, which is at the left-hand side. The needle will now remain stationary, while in the meantime the lever 68 will have been operated upon by the race in which it runs in a manner to carry the nut upward again, as shown in Fig. 8, and the turning of the looper-shaft will cause the thread carried by the looper-arm to be looped around the needle, whereupon the needle will carry the thread back with it in its rearward throw.

The looper-shaft is revolved only while the friction-roller of its lever is in the eccentric section $b'$ of the cam groove or race, remaining stationary while the lever traverses the concentric section.

A box 71 is erected upon the right-hand face of the left-hand web 29, the said box being provided with an opening 72 at its rear and at the rear portion of its right-hand side, as shown in Fig. 10. A take-up bar 73 is held to slide in the said box, a portion projecting beyond the front of the box, while at the rear of the take-up bar an angular arm 74 is formed, which extends outward from the rear opening of the box 71 and is provided with a friction-roller 75, which engages with a cam 39 on the right-hand face of the disk C on the drive-shaft, the said cam, as shown in Fig. 9, being somewhat of an elliptical shape. Therefore the action of the cam will be to force the take-up bar outward when its point contacts with said bar, and the take-up bar may return when the butt of the cam is presented to it.

A housing 76 is located upon the forward end of the take-up bar, being provided with a grooved roller 77, which will be over the upper end of the looper-shaft. This roller is adapted as a guide for the thread before entering the shaft, and a second guide-roller 78 is provided for the same purpose at the rear portion of the box 71. The take-up bar is returned through the medium of a spring, and, as shown in Figs. 9 and 10, this result is preferably accomplished by means of a slot 79, which is made in the body of the bar, and a spring 80 is placed in this slot, having bearing against its rear end, and the forward end of the spring is secured to a post 81, attached to the bottom of the box 71 and extending upward within the said slot. When the take-up bar is forced outward, this spring is compressed, and when the cam 39 will permit the spring will return the bar inward and will tend at all times to keep the friction-roller 75 in proper engagement with the cam.

Since the thread is a waxed thread, it is desirable that the wax thereon should be kept soft while it is being passed to the looper-shaft, and this is preferably accomplished by forming an angular channel 82 in the top of the web 29, as shown in Fig. 11, steam being introduced at the forward end of this channel by means of a pipe 83, connected with it and leading to any source of steam-supply. The steam escapes from the channel through the medium of a pipe 84, as shown in Fig. 1, and this pipe is adapted to supply steam to a jacket around the tension-wheel E.

The tension-wheel, as shown in Fig. 20, is immediately to the rear of the rearward guide-roller 78, and its construction is best shown in Fig. 20, in which it will be observed that a sleeve 85 is secured on the drive-shaft 34, and said sleeve, for example, at its left-hand end is enlarged and provided with an annular chamber 86. The tension-wheel E is loosely mounted on said sleeve, and a jam-nut 87 is screwed upon the reduced end of the sleeve, which is threaded, to an approximate engagement with the said wheel. Therefore it will be observed that the steam passing through the pipe 84 will enter and fill the sleeve-chamber 86 and will tend to heat the sleeve and likewise the tension-wheel and keep the wax on the thread moist.

The tension-wheel is provided with a peripheral groove 88, in which the thread is made to enter, being passed, for example, once around the wheel, and, as shown in Fig. 2, the wheel is also provided with a keeper 89, adjacent to its peripheral groove, over which the thread may be looped, and it is therefore evident that by turning this wheel the thread may be carried entirely around it with but little trouble, a loop of the thread being removed from the keeper when the latter again comes uppermost.

The thread is preferably coated with wax, as shown in Fig. 3, in which, adjacent to the rear of the machine, a wax pot or box 90 is suitably supported, and this pot or box is constructed with double side and bottom walls, whereby a space 91 is formed around what may be termed the "inner" box, which is adapted to contain the wax, the space being closed at the top all around the box, and the steam from the heating-chamber of the tension-wheel enters this space 91 through the medium of a pipe 92, and the top of the box is preferably entirely closed by means of a cover 93.

A substantially U-shaped tubular thread-guide 94 is suspended in the box of wax, one end of the guide being passed up through the cover, and the cover is provided with an opening 95 over the opposite end, and the lower face of the bottom portion of the thread-guide is open or cut away, as shown at 96. The thread 97 is drawn from a suitable reel 98, supported upon a bracket 99 or its equivalent, usually attached to the rear portion of the wax pot or box, and the thread is passed over a guide-pulley 100, and thence down into the thread-guide 94, coming in contact with the wax throughout its travel in the guide, since it will be substantially filled with the heated wax entering at the bottom. The thread is passed up from the wax-pot over a wheel 101, forming a portion of the main tension device H, to be hereinafter described, and from this wheel the thread is carried over the advanced and auxiliary tension-wheel E to the take-up, and thence down through the looper-shaft.

The surplus wax is removed from the thread as it passes from the wax-pot by means of suitable strippers 93$^a$. (Shown in Fig. 3.) The main tension device H is shown in detail in Fig. 19, in which it will be observed that the wheel 101 is loosely mounted on a shaft 102, and said shaft is supported in bracket-arms 103, projected rearwardly from the sides of the frame of the machine. The tension-wheel is provided with a peripheral groove 104 to receive the thread, and a packing 105 is placed at each side of the wheel, adapted to receive a lubricating compound, while washers 106 are made to bear against the said packing.

The ends of the shaft are made to enter sleeve-bearings 107, which are provided with a suitable head at their outer ends, and with an exterior thread 108, the threaded portion of the sleeves being screwed into the brackets 103. The inner end of each sleeve is reduced in diameter, the reduced portion being designated as 109, and the said reduced portions of the sleeves are surrounded by springs 110, which have bearing against the washers of the tension-wheel 101. Thus it will be observed that by simply screwing inward the threaded sleeve 107 the springs may be made to bear to a greater or a less degree against the wheel, affording more or less frictional contact, and thereby regulating the tension.

The auxiliary tension-wheel E adds greatly to a machine of this character, since it permits of a stronger tension than can be obtained from the single or ordinary tension devices employed.

The auxiliary tension-wheel is controlled through the medium of a brake, and by means of this brake more or less resistance may be offered to the rotation of the wheel. This brake is shown particulary in detail in Figs. 25 and 26, in which it will be observed that a bracket or standard 111 is secured upon the upper top portion of the frame of the machine and is curved forwardly over the aforesaid auxiliary tension-wheel, terminating at its forward end in an eye or sleeve. An arm 112 is pivoted at or near its rear end upon the lower portion of the standard 111, and the forward end of this arm is pivotally connected with a brake-shoe 113, the connection being made by a pin on the shoe passing through an elongated slot or opening in the arm 112, which may be termed a "bracket-carrying" arm. The brake-shoe preferably consists of a segmental casing substantially U-shaped in cross-section, one member being longer than the other, and the longer member is adapted to pass downward at what may be termed the "plain" side of the auxiliary tension-wheel, and the said casing is made to carry a facing or packing 114, of felt or equivalent material, which is brought directly in contact with the tension-wheel.

The degree to which the brake shall be applied to the tension-wheel is regulated in the following manner: A stud 115 is made to extend upward from the brake-shoe and is secured to an exteriorly-threaded sleeve 116, which is held to turn in the eye of the standard 111, the said eye being interiorly threaded. The outer end of the sleeve 116 is fitted with a suitable thumb-nut and hand-wheel, whereby it may be turned, and a spring 117 is coiled around the aforesaid stud 115, attached to the shoe, and by screwing downward the regulating-sleeve 116 the spring 117 will be compressed to a greater or less degree, forcing the shoe more or less firmly against the wheel. A trip-arm 118 is pivoted to the rear end portion of the brake-carrying arm 112, and a spring 119, placed between the two arms, as shown in Fig. 26, normally forces the trip-arm over upon the first cam-disk B. The trip-arm 118 at its forward end is provided with a foot 120, pivotally attached to what may be termed its "outer face," and the outer edge of this foot is beveled, particularly at one end, while upon the periphery of the aforesaid cam-disk B a brake-block 121 is firmly secured, one end of the said brake-block being beveled, and at or near the center of the block a rib 122 is secured. It may be further remarked that the edge of the brake-block facing the shoe 120 is more or less beveled at one end. Therefore when the drive-shaft turns in a direction to operate the machine the shoe 120 will simply slip up the brake-block 121 whenever they come in contact, since their beveled opposing faces will meet and the foot 120 will be forced inward against the tension of the spring 119. When, however, it is desired to remove the brake temporarily from the auxiliary tension-wheel E, in order, for example, to remove the shoe or to permit of the thread being slackened at the needle, the disk B is permited to revolve until its brake-block has just passed the foot 120 on the trip-arm, whereupon, by reversing the direction of rotation of the drive-shaft, the foot 120 will run up on the brake-block 121 and will strike the rib 122 thereof, thereby raising both the trip-arm and the brake-carrying arm 112, and consequently the brake-shoe 113, since, although the trip-arm has lateral movement independent of the brake-carrying arm, the trip-arm enters a recess in the brake-carrying arm at its pivot end, which compels the two arms to have concerted vertical action.

A take-up roller is located between the main take-up and the auxiliary tension-wheel E, as shown in Fig. 9, to keep the thread passing from the tension-wheel to the take-up always taut. To that end an angled bracket 123 is located upon the inner face of the web 29 at the forward lower portion thereof, the horizontal arm of the bracket being made to extend forwardly, and it is upwardly curved at its forward extremity to receive a roller 124, over which the thread from the auxiliary tension-wheel passes before being carried to the take-up. The vertical member of the bracket is provided with a longitudinal slot 125, through which a screw or pin 126 passes, permitting the bracket to have a vertical or side adjustment. Downward tension, however, is constantly applied to the bracket through the medium of a spring 127, secured to the lower end of the bracket and to the said stud.

The needle 137 is a curved needle and is operated from the cam-race 38 in the cam-disk C, as shown in Figs. 11 and 12. The said cam-race is somewhat oval, embodying a section $c$, concentric with the drive-shaft 34, and an irregular section $c^2$, eccentric to the drive-shaft, which irregular section is provided with an intermediate section $c^3$, at which the throw of the cam will be at its minimum. An angled lever 128 is fulcrumed, preferably, upon the web 29 of the machine, and said angle or elbow lever is provided with a friction-pulley 129 at one end, adapted to travel in the aforesaid cam-race 38. The opposite end of the angle or elbow lever 128 is pivotally connected with an arm 130, which is upwardly and outwardly curved in the direction of the front of the machine.

Immediately below the bracket-carrying looper-shaft and at the rear thereof a segmental recess 131 is produced in the inner face of the frame-web 29, as shown in Figs. 11, 12, 15, 16, 17, and 18, and the upper portion of this recess is covered by a segmental plate 132, forming a slideway for a segmental block 133, said segmental block being adapted to carry the needle 137, which is attached thereto by an adjustable plate 136. The needle-segment is pivoted to the said web 29 at its contracted end by means of a pin 134, which is provided with a head $134^a$ at what may be termed its "inner" end and is held in a sleeve formed upon the said web 29 by means of a set-screw $134^b$, as shown in Fig. 18.

An arm 135 is secured to the inner face of the wider portion of the needle-segment and is pivotally connected to the curved arm 130, connected with the lever 128, and through the medium of the said lever, acted upon by the aforesaid cam, the needle-segment is rocked upon its pivot. A needle-guide 138 is pivoted upon the aforesaid pivot-pin 134, adjacent to its head $134^a$, and this needle-guide comprises a body, by means of which it is pivoted, and a downward extension from the body in the nature of an arm, the said arm at or near its lower end being provided with a curved opening 139, through which the needle passes and from which the needle is not removed while in the machine. The needle-guide arm is limited in its movement by forming on its arm-section a stud 140, which enters a recess 141 in the head of the pivot bolt or pin 134, and the upper portion of the body of the needle-guide arm about opposite the stud 140 is provided with a shoulder or tooth 142, and adjacent to this shoulder or tooth a pin 143 is secured, the said pin 143 being connected by a spring 144 with a like pin $143^a$ upon the arm 135 of the needle-segment. The tendency of this spring is to draw the needle-guard arm forwardly, and the said arm is carried rearwardly with the needle by producing on the upper portion of the contracted section of the needle-segment a shoulder 145, adapted for engagement with the tooth or shoulder 142 on the needle-guard arm.

In the operation of the needle the friction-roller 129 of the lever 128 will be at one point $c'$ of the cam-race 38 when the needle is at its full forward throw, as shown in Fig. 11. The needle will commence to return as soon as the friction-roller 129 of the controlling-lever commences to enter the irregular portion $c^2$ of the said cam-race, and this travel of the lever 128 will carry the needle-segment upward and outward and will cause its shoulder or tooth 145 to engage with the corresponding projection from the needle-guard arm, and the said needle-guard arm will be forced rearward with the needle, as shown in Fig. 17, in which the needle is at its full rearward throw, being in the first position or at its full outward throw in Fig. 15 and in its intermediate position in Fig. 16. When the needle is fully returned, the actuating-lever 128 will be at the point $c^3$ at or about the center of the irregular section $c^2$ of the cam-race, and the needle will therefore remain stationary for a time, since the throw is very slight at this point in the race, and at this time the looper-shaft will be operated to bring it into position to deliver the thread properly to the needle upon the outward throw thereof. As the controlling-lever 128 travels toward the opposite point $c$ in the said cam-race 38 the needle will commence its forward throw, finishing it when the lever reaches the aforesaid point, and the spring 144, attached to the needle-guard arm, will carry the said arm downward and forward with the needle, serving to constantly protect it, and when the needle is at its full outward throw it will remain stationary during the travel of the friction-roller 129 of the actuating-lever around the concentric portion $c'$ of the said cam-race, and during this rest of the needle the looper-shaft will have been operated from its cam, as heretofore stated, to form a loop or thread around the needle-point.

The feed device is as follows and is operated from the farther cam-disk D, being shown principally in Figs. 1, 2, 13, 14, 21, 22, 23, and 24: The stud 148 is horizontally secured upon the forward portion of the web $29^a$ of the main frame. The said stud is shown in Figs. 1 and 2 and is there shown as provided with a sleeve 149, which is mounted to slide on said stud and likewise to rock. At what may be termed the "inner" end of the sleeve 149 an arm 150 is carried in direction of the needle and thence vertically downward at what may be termed the "right" of the needle, and upon the vertical portion of the said arm 150 the feed-foot 151 is adjustably secured, the adjustment being accomplished by bifurcating the upper end of the foot and passing between the bifurcations set-screws 152. The foot is provided with a toe 153, which is inclined inwardly and downwardly in direction of the shoe rest or table G and is adapted to enter the undercut in the sole of the shoe, as shown in Fig. 27. An arm 154 is rearwardly projected from the inner rear portion of the sleeve 149, and the said arm, as shown in Figs. 13 and 14, is provided at its rear end with a friction-roller 155, which enters the cam-race 40 in the inner face of the aforesaid cam-disk D, and the said cam-race is provided with a high plane $d$ and a low plane $d'$.

The adjustment or throw of the feed foot or shoe 151 is regulated by the mechanism shown in detail in Figs. 21, 22, 23, and 24, the said regulating mechanism consisting of a lever 156, fulcrumed at its lower end upon a stud 157, forwardly and downwardly projected from the right-hand lower portion of the main frame, the slot 158 in the said lever extending longitudinally thereof, and the lever extends upward in front of the periphery of the cam-disk D, in which the cam-race 41 is produced, being straight with the exception of two points $d^2$ diametrically opposite, wherein the race is serpentine or zigzag, as shown in Figs. 1 and 2, and likewise in Figs. 13 and 14.

At the upper rear end of the lever 156 is a bracket extension 159, carrying a friction-roller 160, which travels in the aforesaid cam-race 41 of the said disk D, and the bracket projection 159 is provided with a vertical groove 161 in its inner face at the side, as shown in Fig. 23. A link 162, the slot 163 wherein is also longitudinal, is placed in front of the lever 156, being shorter than the said lever, and at the upper rear end of the link an ear 163ª is formed, by means of which the said link is pivotally connected with the rearwardly-extending arm 154 of the sleeve 149, as shown in Figs. 21 and 22. The fulcrum-point of the link is changed, and consequently the throw of the feed foot or shoe is varied by the shifting of a connecting and fulcrum pin H', uniting the lever and link. This pin is provided with a forward threaded surface 164, extending outward beyond the link 162, and receives a lock-nut 165, which in tightening up the fulcrum-pin is screwed firmly against the link. The pin is provided with an elongated flattened surface 166, fitted to slide in the slot 163 of the link 162, and at the rear of the enlargement 166 the pin is provided with a further enlargement 167, which serves to space the link 162 and the lever 156, and finally the pin is passed through a block 168, which is fitted to travel in the slot 158 of the lever 156, the rear end of the pin being provided with a head 169, a nut, or the equivalent thereof. Thus it will be observed that by carrying the fulcrum-pin downward the throw of the feed shoe or foot will be increased, while when the pin is carried upward the throw will be decreased. In the operation of this feed the feed-shoe has a main back-and-forth movement in the direction of the length of the pin 148, produced by the sliding movement of the sleeve 149 on the pin 148, brought about by the friction-roller 160 entering the serpentine portions of the cam-race 41 of the cam-disk D, and in addition to this movement the feed shoe or foot has an inward and outward movement to and from the shoe rest or table, which is accomplished by the friction-roller 155 on the arm 154 reaching the high or low planes $d$ and $d'$ in the side cam-race of the aforesaid cam-disk D.

When the needle is taking a stitch, the friction-roller on the arm 154, imparting to the feed-shoe its outward and inward throw, will have passed the higher plane of its cam-race and will thereupon be moved forwardly or away from the shaft. At the termination of its outward or forward stroke the friction-roller on the lever 156 will have entered one of the serpentine portions of the cam-race 41 of the cam-disk D and will carry the sleeve 149, and consequently the feed-shoe, laterally in direction of the right-hand side of the machine. Just about at the time that the needle commences to return to draw the thread and finish the stitch the arm 154 will have been manipulated by its friction-roller entering the lower plane of the cam-race in a manner to carry the feed-foot inward in direction of the table, and as the needle reaches about its inward throw the lever 156 will have been manipulated through the medium of the cam-race 41 and will force the feed foot or shoe in direction of the left-hand side of the machine and feed the material to a proper distance to receive the next stitch.

In Fig. 27 I have illustrated the breakdown holding the upper to the sole, the upper and last controlling it being pressed against the rest or table, the needle taking the thread to make the stitch. The upper K is turned down from the sole K' before it is sewed, as shown in Figs. 27 and 28, and the stitch is made, as illustrated in Figs. 28 and 29 at $k$, and after the upper has been sewed to the sole it is turned up above the sole, making a perfect shoe.

In the complete operation of the machine the upper is placed in engagement with the sole, the upper being turned downward, as shown in Fig. 27, and the last is introduced, and the last is made to hold the upper, together with the sole, against the table or rest G, the side of the upper resting against the front of the table and the sole upon the top thereof. The needle being in its inner position, as it is carried outward to make the stitch the breakdown advances, as heretofore stated, with the needle and engages with that portion of the upper which is against the edge of the sole, forming a shoulder and holding the upper in such position that the needle will pass through it and the usual kerf or undercut in the sole. As the needle advances the looper-shaft revolves, as has also been stated, to twist the thread around the needle, and at this time the feed-foot recedes from the shoe. As the needle is drawn back to complete the stitch the breakdown is also drawn rearward and remains stationary, while the looper-shaft is brought in position to carry the thread properly against the needle at its next outward movement, and the feed mechanism advances to feed the shoe forward.

Having thus described my invention, I claim as new and desire to secure by Letters Patent—

1. In a sewing-machine, the combination with a shoe-rest, or table, and a needle held to reciprocate over the table, of a breakdown mounted to reciprocate between the rest or table and needle and following the movement of the needle to and from the rest, the breakdown having its forward end bifurcated between the members of which the needle projects, and provided at its shank with teeth, a vertical shaft adjacent to the shank of the breakdown, a dog carried by said shaft and engaging the teeth of the shank of the breakdown to hold the breakdown at the end of its forward movement, and means for rocking said vertical shaft to disengage the dog at the inward travel of the needle, substantially as described.

2. In a sewing-machine, the combination with a spring-controlled movable shoe rest or table provided with teeth on its shank, of a needle held to reciprocate over said rest, of a spring-controlled breakdown adapted to reciprocate over the table between it and the needle, following the movement of the needle and adapted to hold the upper in engagement with the sole, the shank of the breakdown being provided with teeth above the teeth of the rest or table, a vertical shaft adjacent to the shanks of the rest or table and breakdown, a dog on the shaft and engaging the teeth of both the rest and breakdown when the latter is at its full outward throw, means for rocking the shaft to disengage the dog from the teeth of the rest and breakdown at the inward travel of the needle, and means for drawing back the breakdown while the dog is disengaged, and then releasing it to permit its spring to again force the breakdown forward, substantially as described.

3. In a sewing-machine, the combination with a drive-shaft, a cam-disk thereon, a shoe-rest, and a needle reciprocating over the rest, of a breakdown between the needle and rest, said breakdown having a bifurcated forward end and provided with teeth and a lug on its shank, a pivoted lever having one member engaging the cam-disk and its other member extending into the path of the lug on the shank of the breakdown, a spring secured to the lever and to the shank of the breakdown, a vertical shaft, a dog on the shaft and engaging the teeth of the breakdown-shank, and means for rocking said shaft to disengage the dog from the teeth at the inward travel of the needle, substantially as described.

4. In a sewing-machine, the combination with a drive-shaft, a disk on the drive-shaft and provided with a cam-groove and cam-rib, a shoe-rest, and a needle reciprocating over the rest, of a breakdown between the rest and needle provided on its shank or-bar with a stud and teeth, a pivoted lever having one member engaging the cam-groove of the disk and its other member projecting into the path of the stud of the breakdown, a spring secured to one member of the lever and to the shank or bar of the breakdown, a vertical shaft provided with an angular arm engaging the cam-rib of the said disk, and a dog on said shaft and engaging the teeth of the breakdown shank or bar, substantially as described.

5. In a sewing-machine, the combination with a drive-shaft, a disk on the drive-shaft and provided with a cam-groove and a cam-rib, and a reciprocating needle, of a sliding and spring-pressed shoe-rest provided with teeth on its shank, a breakdown above the shoe-rest and provided with teeth and an upwardly-projecting stud on its shank, a pivoted lever having one member engaging the cam-groove of the disk and its other member projecting into the path of the stud of the shank of the breakdown, a spring secured to the lever and to the breakdown-shank, a vertical shaft provided at its upper end with an angular arm engaging the cam-rib of the disk, and a dog on the shaft and engaging the teeth of the shanks of the rest and breakdown, substantially as described.

6. In a sewing-machine, the combination with a shaft, of a sleeve fitting upon the shaft and having one end enlarged and provided with an annular chamber, and its reduced portion screw-threaded at its end, a tension-wheel loosely mounted on the sleeve, a jam-nut on the sleeve, and means for conveying steam to the said chamber, substantially as and for the purpose set forth.

7. In a sewing-machine, the combination with a tension device, and a take-up, of an auxiliary tension-wheel of greater diameter than the surface of the main tension over which the thread passes, and a spring-controlled take-up roller, located adjacent to the auxiliary tension-wheel, the thread being passed from the ordinary tension around the auxiliary tension, around the spring-controlled take-up roller and to the main take-up of the machine, substantially as described.

8. In a sewing-machine, the combination with a take-up device, and the tension device, of an auxiliary tension device, consisting of a channeled wheel loosely mounted upon a support and placed between the take-up and tension device, a brake normally in engagement with the auxiliary tension-wheel, and means for raising the said brake at a reversal of the driving-shaft of the machine, substantially as described.

9. In a sewing-machine, the combination with the take-up, the tension device, the main shaft, and a pulley secured thereon, of an auxiliary tension, consisting of a peripherally-grooved wheel loosely mounted on the drive-shaft and located between the take-up and tension device, a spring-controlled brake normally in engagement with the auxiliary tension-wheel, an inclined plane formed upon the periphery of the said pulley, and an arm projected from the said brake having a shoe adapted to travel up the inclined plane of the pulley when the pulley is given backward movement, as and for the purpose specified.

10. In a sewing-machine, the combination with the take-up, the tension device, the main shaft and a pulley secured thereon, of a spring-controlled brake normally bearing on the auxiliary tension-wheel, a lever-arm connected with the said brake, a trip-arm having lateral movement independent of the lever-arm but vertical movement in conjunction therewith, an inclined plane formed upon the said pulley and provided with an offset, a shoe pivotally connected with the said trip-arm and adapted to travel up the inclined plane of the pulley when the latter is rearwardly turned, and a spring normally holding the shoe in the path of the said inclined plane, as and for the purpose set forth.

11. In a shoe-sewing machine, the combination with a support, a segmental needle-holder pivoted upon the said support, and a driving mechanism, substantially as described, connected with the said needle-holder, of a guide-arm pivoted independent of and adjacent to the said needle-segment, a spring connected to the guide-arm and to the needle-holder and normally maintaining the needle-guide in a predetermined position, and an offset formed on the needle-guide, adapted to meet an equivalent construction on the needle-segment, whereby the needle-segment at one end of its throw will carry the needle-guide in the same direction, as and for the purpose set forth.

12. In a sewing-machine, the combination with a pivoted segmental needle-holder, and means for operating the holder, of a guide-arm on the pivot of the needle-holder, said guide-arm being provided with a stud working in a recess of the head of the said pivot-pin and with a shoulder opposite the stud and adapted to engage a shoulder on the needle-holder, and a spring secured to the guide-arm and needle-holder, substantially as described.

13. In a sewing-machine, the combination with a pivoted segmental needle-holder, provided with an arm having a pin projecting therefrom, and means connected with said arm for operating the holder, of a pivot-pin provided with a recess in its head, a guide-arm on the pivot-pin and provided with a pin working in the recess of the head of the pivot-pin and with a pin and shoulder opposite the recess, the shoulder being adapted to engage a shoulder on the needle-holder, and a spring having one end secured to the pin of the guide-arm and its other end to the pin of the arm of the needle-holder, substantially as described.

14. In a shoe-sewing machine, the combination with a tubular looper-shaft provided with a looper, and means for rotating said shaft, of a slideway, a take-up provided with a thread-receiving pulley at its outer end, means for reciprocating said take-up in said slideway and passing the pulley over the looper-shaft and having a pulley at its inner end and an opening between its ends within the slideway, a spring located in said opening having bearing against its rear wall, and a pin extending within the opening and secured to a slide likewise attached to the said spring, a drive-shaft, and a cam operated by said shaft and engaging with the inner wall of the said take-up, substantially as and for the purpose set forth.

15. In a turn-shoe sewing-machine, the combination with a table or rest, comprising a body portion and a shank, the body portion being provided with a longitudinally-arched front and having a curve in one side at one end meeting the shank, and a curve at the same end in the top likewise carried to the shank, of a breakdown held to reciprocate over said table, the said breakdown being curved in direction of the curvature of the table and upwardly and outwardly in direction of its front, having a claw-front end for the passage of the needle, the breakdown being adapted to hold the upper on the periphery of the sole to be sewed, breaking down the upper and forming a shoulder to receive the needle, substantially as and for the purpose set forth.

16. In a shoe-sewing machine, the combination with the take-up, and tension device, an auxiliary tension intermediate of the main tension device and take-up, and a brake mechanism adapted to control the intermediate or auxiliary tension, of a spring-controlled sliding arm attached to a support below the auxiliary tension device and the take-up and provided with a pulley at its upper end, substantially as and for the purpose specified.

ADAM H. PRENZEL.

Witnesses:
  GEO. W. HUBLER,
  CHARLES S. ADAMS.